(No Model.) 7 Sheets—Sheet 4.
A. V. RUCKMICH.
TYPE SETTING MACHINE.
No. 493,448. Patented Mar. 14, 1893.
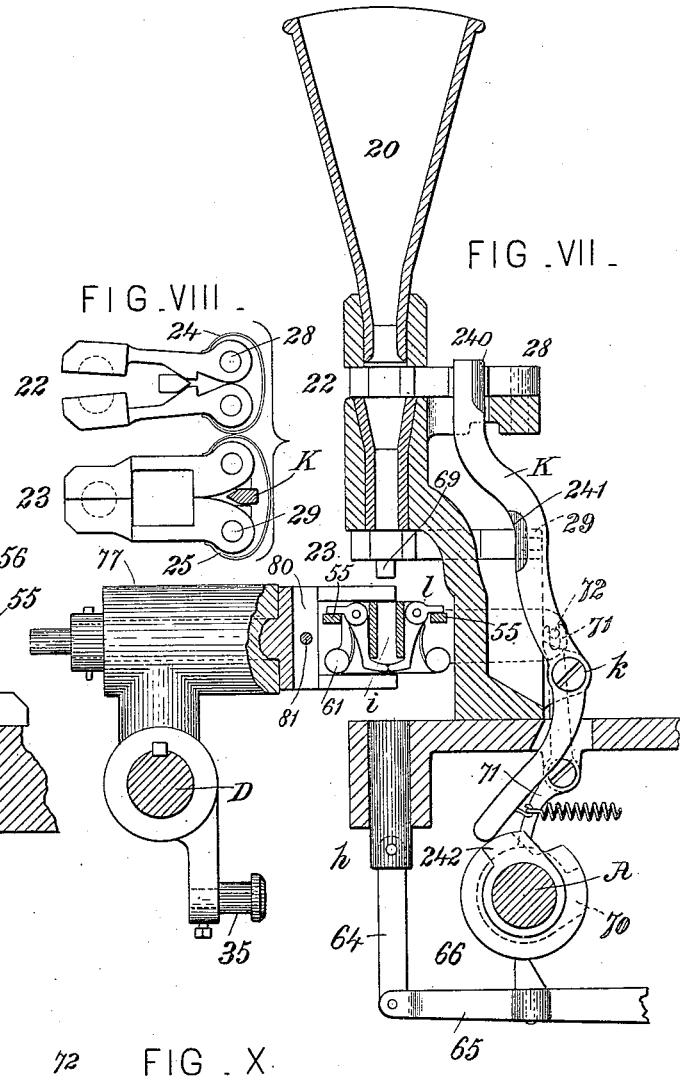

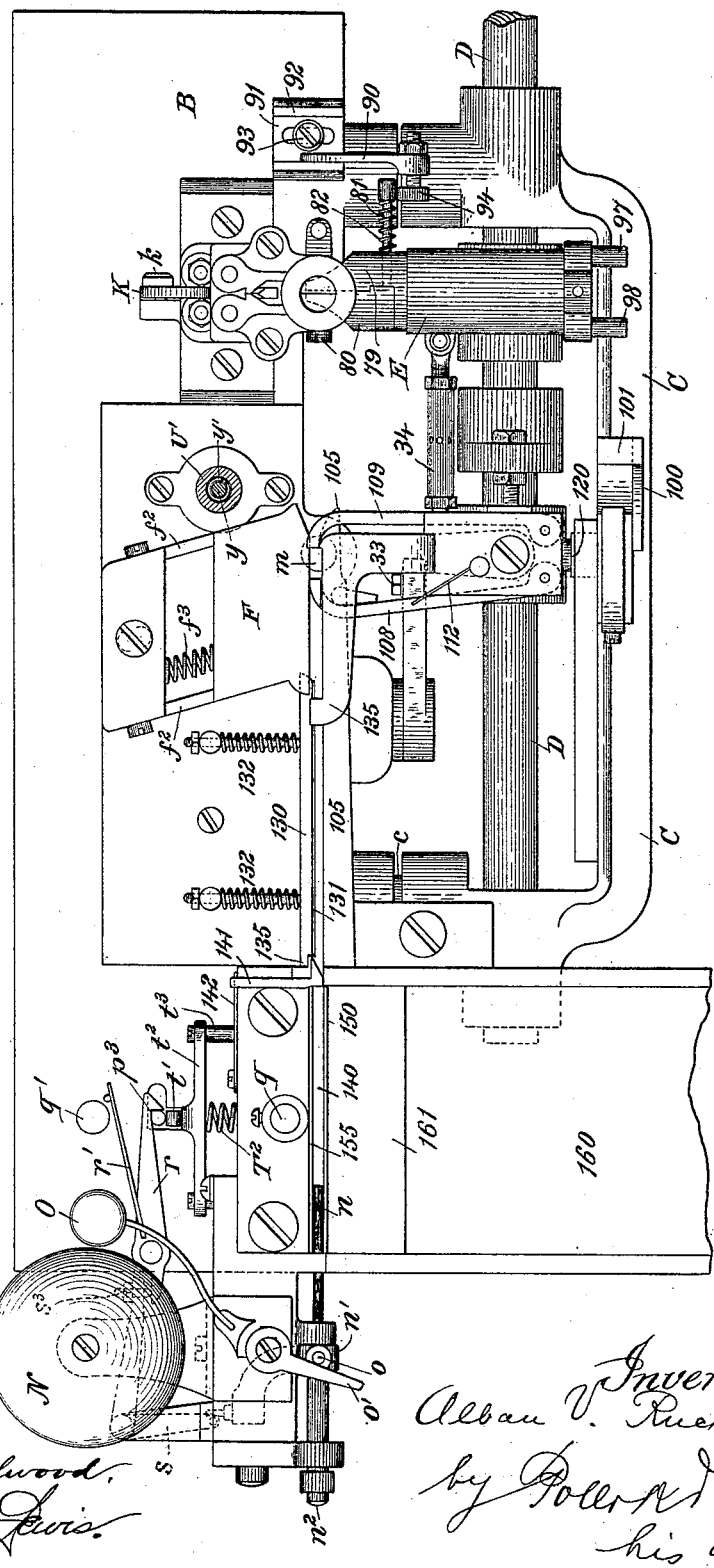

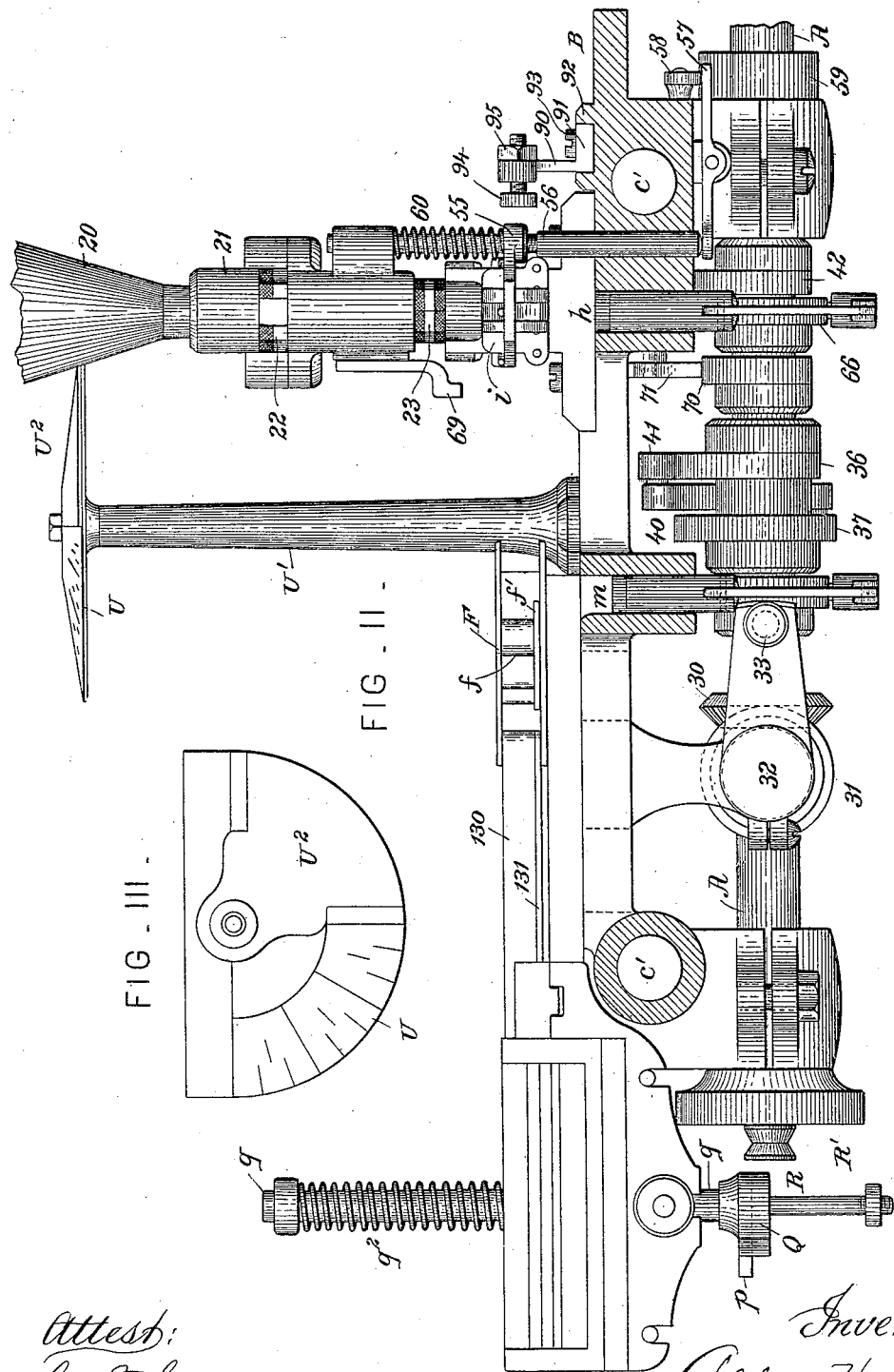

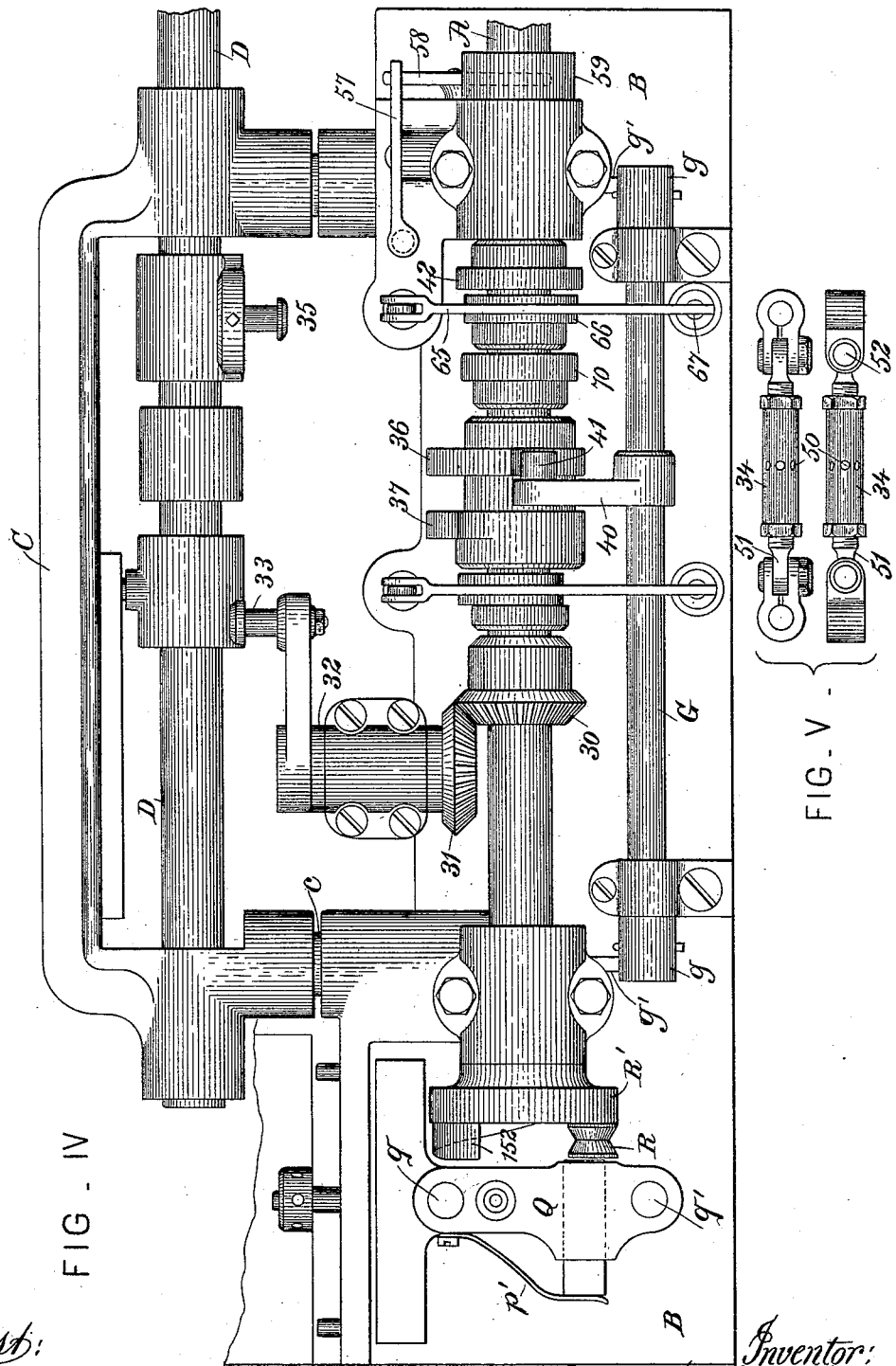

(No Model.) 7 Sheets—Sheet 5.
A. V. RUCKMICH.
TYPE SETTING MACHINE.
No. 493,448. Patented Mar. 14, 1893.
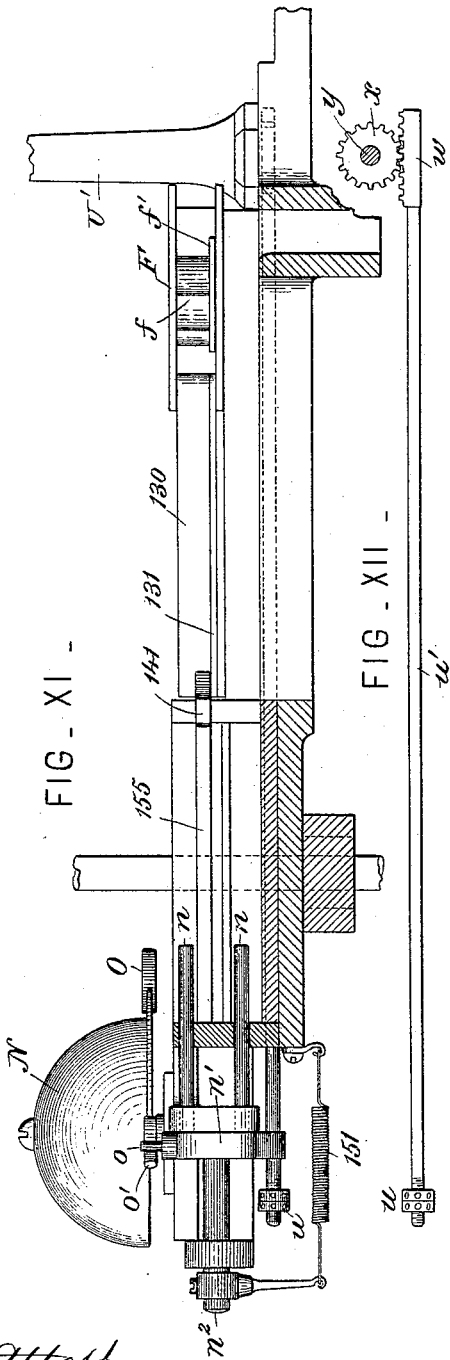
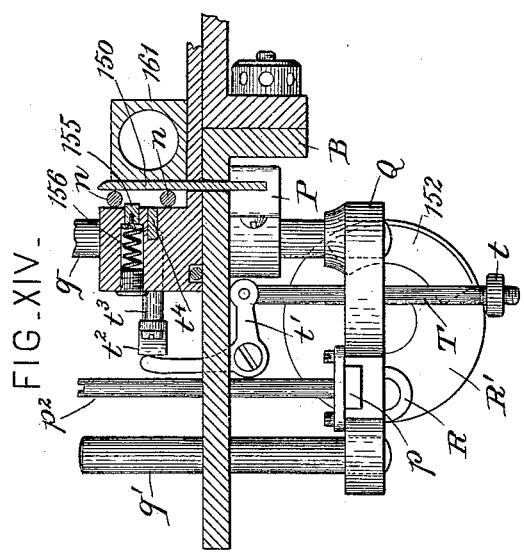
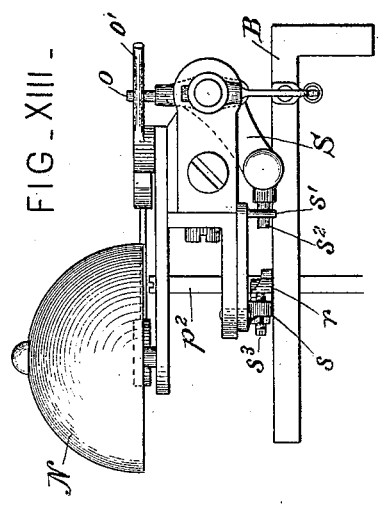

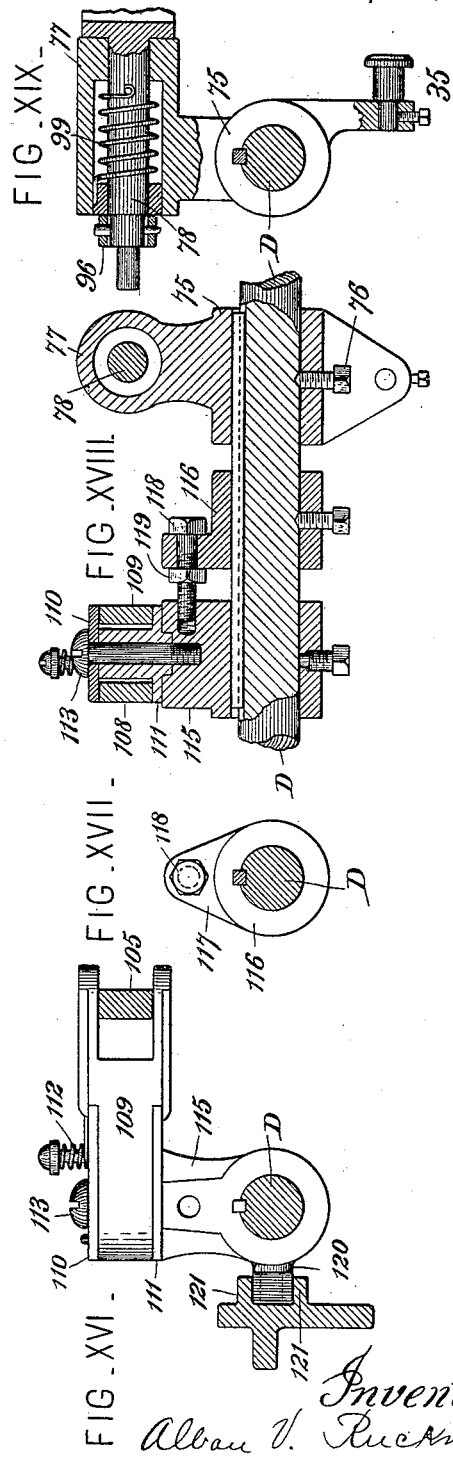

(No Model.)
7 Sheets—Sheet 7.
A. V. RUCKMICH.
TYPE SETTING MACHINE.
No. 493,448. Patented Mar. 14, 1893.
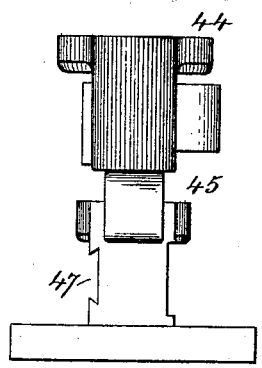
FIG. XX.
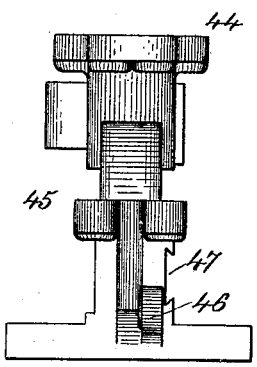
FIG. XXI.
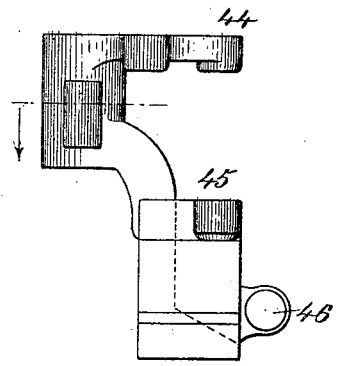
FIG. XXII.
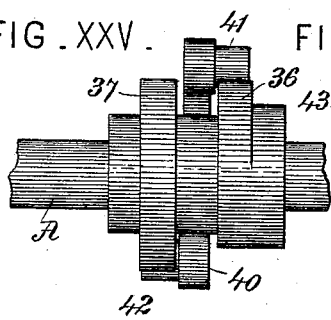
FIG. XXV.
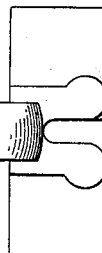
FIG. XXIII.
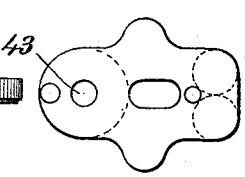
FIG. XXIV.
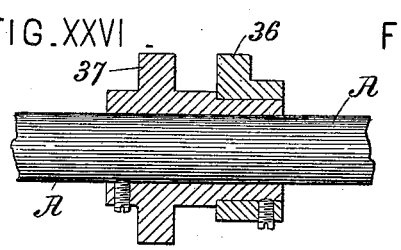
FIG. XXVI.
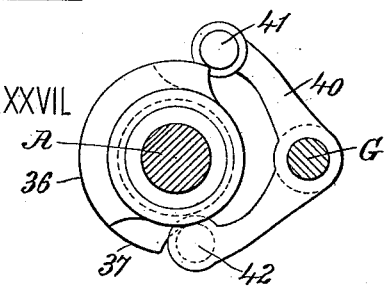
FIG. XXVII.
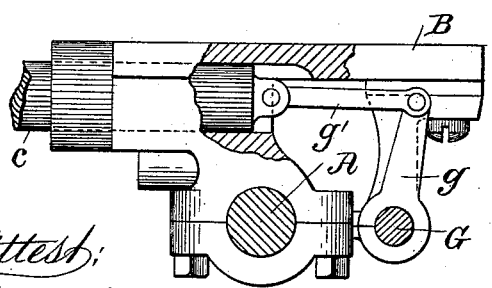
FIG. XXIX.
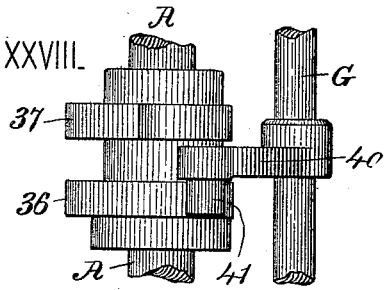
FIG. XXVIII.
Attest:
Geo. T. Smallwood.
Beow Lewis.
Inventor:
Alban V. Ruckmich,
by Pollok & Mauro,
his attorneys

UNITED STATES PATENT OFFICE.

ALBAN V. RUCKMICH, OF NEW YORK, ASSIGNOR TO JULIAN W. CHADWICK, OF BROOKLYN, NEW YORK.

TYPE-SETTING MACHINE.

SPECIFICATION forming part of Letters Patent No. 493,448, dated March 14, 1893.

Application filed April 2, 1892. Serial No. 427,503. (No model.)

*To all whom it may concern:*

Be it known that I, ALBAN V. RUCKMICH, a resident of New York city, in the county and State of New York, have invented a new and useful Improvement in Type-Setting Machines, which improvement is fully set forth in the following specification.

This invention has reference to machines for setting and composing type, and more particularly to that class of machines for which Letters Patent have heretofore been granted to A. Lagerman, No. 362,751, dated May 10, 1887, to John Gustafson, No. 427,685, dated May 13, 1890, and to J. W. Chadwick, No. 429,754, dated June 10, 1890.

In its general organization the improved machine resembles that described in the Gustafson patent above referred to, and the invention consists in certain improvements in the various elements or features of the machine, and in certain particular constructions, arrangements and combinations of parts, as hereinafter described and claimed.

The main object of the invention is to dispense, at least to a great extent, with the necessity of justifying the lines of composed matter; and to this end an index is provided which comes into action as each line nears completion, and shows to the compositor in ems or fractions of an em, just how much space is required to fill the line. Combined and co-operating with the index, is a cut-off mechanism, which, when the line is filled (i. e. reaches the predetermined length) automatically cuts off the line, and pushes it, with all the lines previously set up, along the galley, thus clearing a space for the next succeeding line.

The various improvements, with their specific objects, can be most conveniently explained in connection with the accompanying drawings, in which Figure I, is a plan view of a type-setting machine constructed in accordance with the invention. Fig. II, is a sectional elevation, the bell mechanism being omitted. Fig. III, is a detail of the index or indicator. Fig. IV, is a plan of the underside of the machine. Fig. V, is a detail of the flexible connecting rod. Figs. VI and VII are vertical sections, taken in planes at right angles to each other through the axis of the funnel. Fig. VIII, shows the two traps in plan. Figs. IX and X illustrate the construction of the parts which support the feelers. Fig. XI, is a partial longitudinal section and elevation. Fig. XII is a detail of the indicator-operating rod. Fig. XIII, is an end elevation, and Fig. XIV a sectional elevation of the cut-off mechanism. Fig. XV, is a front elevation of the carrier. Figs. XVI, XVII, XVIII and XIX are details of parts of the pincher-mechanism. Figs. XX, XXI, XXII, XXIII and XXIV are details of the frame which supports the funnel and traps. Figs. XXV, XXVI, XXVII and XXVIII are detail views illustrating the cams and connections for moving the carrier transversely. Fig. XXIX, is a transverse section partly in elevation.

The motions of the various parts are all derived from a main-shaft A journaled in bearings in the frame B and on which are cams whose function will be hereinafter described in detail.

C represents the carrier for the feed slide. It is provided with cylindrical rods or studs $c$ which fit and slide freely in tubular sockets $c'$ in the main frame, so that said carrier can reciprocate transversely in a horizontal plane.

D represents the feed-slide, shown in the form of a cylindrical bar, and adapted to slide longitudinally in ways of the carrier C. The said slide carries the pinchers and the other feeding devices, whereby the type are carried from the funnel to the galley.

In operation, supposing the parts to be in the position shown in Fig. 1, the feed-slide D moves to the left, feeding the type forward one stage, the carrier C being stationary. When the slide D reaches the end of its stroke, carrier C moves out, away from the frame B, and slide D returns to the right for a new feed. Carrier C then moves into the position first described, and these four motions are repeated indefinitely. By these motions the type is carried by the pinchers E, to a position in front of the tripper-support F, the type being reversed during this motion, if necessary. The next motion carries the type past the trippers, and the third pushes it into the galley. These motions of the feed slide D and its carrier C are derived from the main shaft A in the following manner. A bevel gear 30 on the main shaft drives the gear 31 on the cross shaft 32. The latter carries the crank pin 33, which is attached by the jointed connecting rod 34 (Fig. V.) to a pin 35 on slide D, whereby said slide is reciprocated. The employment of this crank movement is found to be a great improvement over a cam, as heretofore used, as a very slight wear upon the latter made a great difference in the throw of the feeding devices.

As shown in Fig. V, the flexible connection-rod is composed of a sleeve having pin holes 50, the ends of the jointed pins 51, 52, being screwed into the sleeve, so that by turning the latter the length of the connection-rod may be accurately adjusted. The main shaft also carries two cams 36, 37 whose construction is clearly shown in Figs. XXV–XXVIII. These cams impart an oscillatory motion to a forked arm 40, provided with friction rollers 41, 42, which make contact with the surfaces of cams 36, 37, respectively. Arm 40 is fixed on a rock shaft G and imparts motion thereto, and shaft G is connected with the guide-rods or studs $c$ of the reciprocating carrier C through arms $g$ and links $g'$ (Fig. XXIX).

The particular improvement in this part of the machine resides in the construction and operation of the cams 36, 37 and their connections, whereby a quick motion is imparted to carrier C the moment slide D reaches the end of its movement. Heretofore the motion of the carrier was imparted by eccentrics, so that the feed slide D and its feeding devices (which partake of the motion of carrier C) moved in a path approximating an oval form, and this curving motion of the feed finger which pushed the type into the galley frequently had the effect of turning the same, particularly in the case of thin type. By the abrupt motion of the cams as shown, the carrier C remains stationary until the feed slide reaches the end of its forward motion, at which instant the cams come into action to reciprocate the carrier transversely. Consequently the path of any point on the feed slide is practically a rectangular parallelogram.

The type are deposited by the compositor into the funnel 20 which sets in a tubular socket in the casting 21. The latter is provided with two traps 22 23, separated by a vertical distance a little greater than the length of a type, these traps being so constructed and operated that the movement which opens one closes the other, and vice versa. The traps 22 and 23 are composed each of two jaws pivoted at their extremities (28, 29) in the casting 21, and provided each with a spring (designated 24 and 25 respectively) for closing them.

K represents the operating lever, its shape being best shown in Fig. VIII. It is pivoted at $k$, and at its upper end is provided with a wedge shaped portion 240 which when forced between the jaws 22, causes them to turn on their pivots, so that the trap opens from the center outward. The lower trap 23 is opened by a wedge 241 on lever K, which spreads the jaws in a manner similar to that described; but it will be observed that lever K opens the upper trap on its backward motion. Lever K is actuated by a cam 242 on the main shaft, the tail of said lever being in contact with the surface of said cam. The shape of the casting constituting the support of the funnel and traps is so clearly shown in Figs. XX–XXIV as to require but little description. It has a tubular stem 43 for the passage of the type, flat surfaces 44 and 45 for the support of the traps, an ear 46 for the fulcrum pin of lever K, and a dovetailed recess 47 for the sliding gate hereinafter described. The type having passed the lower trap 23, falls upon the plunger $h$, which descends while the feed slide is making its idle or return movement. The type is now within the three-sided frame $i$ (shown in detail in Fig. X.) which supports the feelers $l$ on three sides of the type, the other feeler $l'$ being carried by a sliding gate or arm $l^2$. These feelers serve the same purpose as the corresponding parts in the Gustafson patent above referred to; that is to say, one of them catches the nick in the type in case the latter happens to fall into the funnel right side up; but the construction has been modified and improved.

The frame $i$ has ears 53 on its three sides, in which the stationary feelers $l$ are pivoted, and the slide $l^2$ has similar ears 54 between which is pivoted the feeler $l'$. A frame 55 (Fig. IX.) embraces the support $i$ being carried by a vertically reciprocating rod 56, which rests on the end of the lever 57 (Fig. II). Lever 57 is actuated by a lever 58, which in turn is actuated by cam 59 on shaft A, so that at the proper moments rod 56 will be raised. It is returned by a coiled spring 60. Frame 55 bears against the underside of the tail-projections of all the pivoted feelers, and when it rises, it turns the feelers on their pivots against the pressure of their springs 61, and opens the way for the descent of the type. The motions are so timed that the feelers separate as the lower trap opens. The latter immediately closes and as plunger $h$ raises the type, the trap acts as a stop, so that the end of the type cannot enter and be caught in the tube 43. The downward motion of the plunger $h$ is effected by a link 64, lever 65 and cam 66. Its upward movement is effected by a spring 67, connecting the rear end of lever 65 with the frame.

The overhanging projection 69 is arranged as heretofore, to be struck by the upper end of the type in the grasp of the pinchers, and to initiate the semi-revolution of the latter to reverse the type, which action takes place, as well understood, when the feelers find no nick on the lower end of the type. When the plunger $h$ reaches the limit of its upward movement, the slide $l^2$ carrying the feeler $l'$ is withdrawn to open the way for the travel of the type. This withdrawal is effected through the operation of cams 70, and lever 71, which is forked at its upper end and embraces a pin 72 on slide l², (Fig. VII.) When slide l² is withdrawn the pinchers come forward and grasp the type.

Certain improvements have been made in the construction of the pinchers, as will now be pointed out. They are carried by a hub 75 which is feathered on to slide D (Figs. VII, VIII and IX.), so as to be adjustable lengthwise thereof. A set screw 76 holds the hub in its adjusted position. The hub 75 is formed in one piece with a sleeve 77, which constitutes a support and bearing for the spindle 78 of the pinchers. The operative end of the pinchers is composed of two jaws 79, 80. The jaw 79 is in one piece with the spindle 78, or rigidly attached thereto, and may be termed the fixed jaw. The jaw 80 is movable with reference to its companion jaw, being attached to a pin 81, (Fig. I) which passes through a hole in jaw 79, and serves to guide the sliding jaw 80, so that the faces of the jaws are always parallel. A spring 82 surrounding pin 81 holds the jaw normally closed. Both the jaws 79 and 80 are cut out at their forward ends, as shown in Fig. VII, so that each jaw has a forked end, the space between the branches of the fork being sufficient to embrace the feelers and their supporting frame. When feed-slide D moves to the left, the head of pin 81 strikes a stop, thereby opening the jaws. The construction of this stop constitutes a feature of the invention. It consists of an arm 90 projecting from a plate 91, arranged to slide between ribs 92 on frame B, and having a clamp screw 93 passing through a slot in said plate so that the arm can be adjusted transversely. In the outer end of arm 90 is screwed the pin 94, the head of which forms the stop for acting on pin 81. The screw pin 94 can be adjusted lengthwise, and is held in its adjusted position by a lock nut 95. This transverse and longitudinal adjustment affords a convenient means for adjusting to a nicety the time of opening of the jaws and their closing upon the type. The repeated striking of pin 81 against its stop produces wear, which can now be taken up by simply turning screw pin 94.

The semi-revolution of the pinchers, to reverse a type which comes into the machine face downward, is effected by means similar in principle to, but differing somewhat in construction from, those heretofore employed. The rear end of the spindle 78 of the type-reverser carries a cross-piece 96, to which are attached pins 97, 98, preferably having each an anti-friction roller. The carrier C has a bracket 100 (Figs. I and XV) at the upper end of which is a projection 101 which overhangs the path of movement of pins 97, 98 when these are in their normal positions. When, however, the jaws of the type-reverser carry an inverted type, the upper end of the latter will strike the overhanging arm 69, as the feed slide advances, and turn the type-reverser slightly, so that the type assume an oblique position, and the pin 98 is raised out of its normal plane so far that it comes in contact with projection 101. Pin 98 is consequently arrested, and as feed-slide D continues advancing, spindle 78 is compelled to turn against the tension of its spring 99, and as it turns, pin 97 describes a curve, in contact with the curved edge 102 of a bar 103 fixed to carrier C. When spindle 78 has been turned so far as to release pin 98 from contact with projection 101, the curved or cam face 102 continues the rotation of the spindle by acting on pin 97 until the latter strikes the end of the guide arm 104, which will occur when the spindle has made a half-revolution and the type is consequently righted. During the further forward motion of the type-reverser, the pins 97, 98 (the former being now in advance) slide between the guide arm 104 and the straight edges of blocks 103, which hold the spindle in its reversed position until the type comes over plunger m. At this moment the carrier C moves abruptly away from frame B, and the type, being held by the arm 105, slips from the grasp of the pinchers. When slide D returns to the right for another feed, spring 99 acts on the spindle 78, the return movement beginning as soon as pin 98 reaches the curved face 102 of bar 103.

The second lifter or plunger m is constructed and operated in the same manner as plunger h, and therefore requires no further description. Its function is, as heretofore to set the type vertically to such position that one of its nicks will coincide with the plane of the tripper-controller.

The tripper mechanism is substantially as heretofore used. It comprises a support F by which the three tripping teeth f and the controlling rib f' are carried. (See Figs. II and XI.) The entire support F is pressed toward the fixed ledge 105 by a spring f³ being guided by plates f², thus accommodating the position of the tripper mechanism to type of different thickness.

The type is carried past the tripping mechanism by feed devices shown in Figs. I, XVI and XVII. These feeding devices consist of jaws 108 and 109 held between plates 110, 111 and bifurcated so that the sill 105 lies in the space between the branches of the fork (Fig. XVI) jaw 108 is pivoted and actuated by a spring 112 tending to press it toward jaw 109. These feed fingers are attached by a screw 113 to a support or hub 115, feathered on slide D, as shown in Figs. XVI and XVIII. Alongside of the support 115, and also feathered on slide D, is a collar 116 having an ear 117 perforated for the passage of an adjusting screw 118. The end of this screw is tapped into a threaded hole in hub 115, so that by loosening the lock nut 119 and turning screw 118, the support and feed fingers may be adjusted lengthwise of slide D. To give steadiness of motion to the feed fingers and counteract all tendency to twist on the slide, hub 115 is provided with a guide pin 120, preferably having an anti-friction roller, which travels in a groove formed between the plates 121 projecting from the inner face of the carrier. (Fig. XVI.) The feed-fingers 108, 109 leave the type between the fixed ledge 105, and the sill 130, the type having now been acted upon by the trippers and consequently having its nicked side turned toward the sill 130. It only remains now for the pusher 135, at the next advance of the feed slide, to push the type into the receiving channel. During this last movement it frequently happened that thin type would turn. To prevent this, the sill 130, which is pressed forward by springs 132, is provided with a rib 131, which, being in line with the controller rib $f'$ (Fig. XI) will enter a nick of the type, and both keep the latter in its correct vertical position, and also aid in preventing it from turning.

It will be observed that the frame of the machine beneath sill 130 is entirely open. Sill 130 is limited in its movement toward ledge 105 by a stop 135, so that a thin type turned the wrong way would not be pressed and held between the parts 105 and 130, but would fall out of the type channel. It is found in practical operation that nearly all the mistakes of the tripper mechanism occur with thin type, and the provision just described permits all such misplaced type to drop out of the machine before reaching the galley, it being easier in correcting proof to insert a missing letter than to take out and replace a type which is turned side wise. Finger 135 pushes the type into the type channel 140, slide 141 being pushed back against the pressure of its spring 142 by contact of the type against its oblique end. Heretofore, as finger 135 was leaving the type, it (the finger) moved in a curved path, as already explained, but by the operation of cams 36, 37 carrier C now begins its transverse movement just as slide D completes its advance, and all tendency to give the type a quarter turn at this point is avoided. The motions of the type have now been followed to its position in the type-receiving channel. When the line approaches completion, the cut off mechanism and justifying indicator are actuated as will now be explained, referring particularly to Figs. I, II, XI, XIII and XIV. In front of the type galley, 160 (which is omitted from Fig. I) is the upright plate 150 which forms one side of the type-receiving channel 140, and which is to be depressed when the line is full to permit the complete line to be pushed into the galley. Near the left hand end of the type-channel 140, lie the pins $n$ attached to the head $n'$ of the sliding rod $n^2$. These parts are normally held in the position shown in Fig. XI, by the spring 151, but when the foremost type of the line comes in contact with the ends of pins $n$, the latter are gradually moved to the left. From head $n'$ projects upwardly a pin $o$ which bears against the tail end $o'$ of the bell-hammer O, and retracts the latter preliminarily to striking bell N. This bell-mechanism is or may be similar to that heretofore used and requires no further explanation. Plate 150 passes through a slot in frame B and is set into a block P (Fig. XIV) which is carried by a cross-bar Q adapted to move downward at the proper moment to withdraw plate 150. Cross-bar Q has two upright guide pins $q$, $q'$ which pass through openings in the frame, the former being surrounded by a coiled spring $q^2$ (Fig. II) which is compressed when the cross-bar Q is drawn down, and which restores it, and all parts carried by it to their normal positions. A transverse slide $p$ is supported in ways of cross-bar Q, and a spring $p'$ (Fig. IV) tends to push this slide to the right. Slide $p$ carries a vertical rod $p^2$, which rod is engaged by a hooked catch $r$ (Fig. I) actuated by a spring $r'$, said catch operating to hold the slide $p$ in the position shown in Fig. IV, against the pressure of spring $p'$. A bell-crank lever $s$ bears at one end against the tail of catch $r$, and the other end of said lever carries a vertical pin $s'$ which is engaged by a horizontal pin $s^2$ on the end of an arm S attached to the sliding head $n'$ already described. It follows that as head $n'$ is pushed forward by the type, lever $s$ will be tilted and catch $r$ retracted until it releases rod $p^2$. This release must take place at exactly the same moment for each operation of the cut-off mechanism, and to secure this precision, rod $p^2$ is provided with a square corner $p^3$ where it is caught by the hook of catch $r$ (Fig. 1,); and to secure accurate adjustment the bearing end of lever $s$ is formed by an adjustable screw $s^3$. The parts are so proportioned that the release of slide $p$ takes place just as the line is filled, and at this moment said slide moves to the right (Figs. II and IV) and its end comes into the path of a crank pin R on a disk R' on the end of main shaft A. When the rotation of the main shaft brings this pin down upon the upper face of slide $p$, the latter is moved downward, carrying with it the bar Q, block P and plate 150, opening the way for admitting the completed line of type into the galley 160. Before bar Q reaches the end of its downward motion, it strikes nut $t$ on a vertical rod T jointed at its upper end to bell-crank lever $t'$ (Fig. XIV) which bears against a cross head $t^2$. The latter carries two sliding bolts $t^3$ to the ends of which is attached the discharging plate $t^4$, which is moved forward by the oscillation of lever $t'$ and returned by the spring $T^2$ (Fig. I).

It will be evident that the described motion of the bar Q when acted upon by the crank pin R, depresses the plate 150, and, when the latter is entirely beneath the level on which the type stand, actuates the pusher or discharge plate $t^4$, pushing the whole line into the galley space, advancing all the lines previously set up and displaying the friction-block 161. As soon as pin R releases the slide $p$, spring $q^2$ retracts the cross-bar Q and connected parts, spring $T^2$ retracts the pusher $t^4$, and spring 151 restores the head $n'$ and connected parts to their normal positions. Slide $p$ is returned by cam 152, and rod $p^2$ is again caught by hook $r$. The type, while in the receiving channel 140, are held by the bar 155 which is pressed forward by a spring 156, and presses the type with light friction against the plate 150. It will be observed that the moment of cutting-off the line is determined by the action of hook $r$, which is the releasing device of the cut-off mechanism, and that for accurate operation it is necessary that the hook should act upon a straight edge or corner, as shown in Fig. I. This cut-off mechanism, however, would be of little value for the purpose of obtaining practically justified lines, without some device to show the compositor, when nearing the end of the line, just how much space remains to be filled. This is the object of the indicator, which will now be described, referring to Figs. I, II, III, XI and XII.

The indicator is shown in the form of a plate U supported on a hollow standard $U'$, and provided with a movable sector $U^2$. As shown in Fig. III the plate U has a graduated quadrant, divided into three main divisions, designed each to indicate the space of an em-quad, these spaces being subdivided into halves and quarters of an em. This graduation, however, is merely a matter of convenience, and may, as well as the construction of the indicator itself, be varied as may be thought advisable. When the head $n'$ has been moved a certain distance by the advancing line of type, it makes contact with a nut or collar $u$ (Fig. XI) screwed adjustably on the end of a rod $u'$, and fixed in position by a lock nut, or by other suitable means, and after such contact the rod $u'$ will partake of the movement of head $n'$. Rod $u'$ has at its other end a rack $w$ which engages a pinion $x$ on a spindle $y$. This spindle passes up through the hollow standard $U'$, and the pointer or sector is mounted on the upper end thereof. The parts must be so adjusted that when the head $n'$ makes contact with nut $u$ the line lacks just three ems of being filled. The action will then be as follows:—When the first type of the line in the type-receiving channel 140 reaches the ends of pins $n$ the latter begin to move, and after moving a short distance the bell sounds and draws the operator's attention to the fact that he is approaching the end of a line. Thereupon he keeps his eye on the indicator and can readily tell whether the word he is then setting up can go in the line, or will have to be divided, and as the pointer $U^2$ nearly reaches the end of its movement will select space types of proper thickness to fill the line exactly, and proceed with the composition. When the limit of the line is reached, catch $r$ releases the actuating slide $p$ of the cut-off mechanism, and during the next revolution of the main shaft, that is before the next type presents itself for admission to the receiving channel, the cut-off mechanism performs its evolutions of depressing the separating plate 150, pushing the completed line into the galley, and restoring all the parts to their normal positions.

Any convenient means for returning the indicator rod $u'$ may be used, as for example a coiled spring $y'$ may be placed around spindle $y$ (Fig. I) for this purpose.

It will be evident to persons skilled in the art to which this invention relates that many details of construction herein described may be replaced by equivalent devices or elements.

Having now fully described my said invention, and the manner of carrying the same into effect, what I claim, and desire to secure by Letters Patent, is—

1. In a type setting machine, the combination with a vertical type-chute or tube, and a lifter beneath the outlet of said chute or tube, of two traps one above the other, in the path of a type descending to said lifter, substantially as described.

2. In a type-setting machine, the combination with a type-chute and a lifter in line therewith, of two traps, one vertically above the other, and devices for opening one trap and simultaneously closing the other, substantially as described.

3. The combination of the two traps in the same vertical line, an oscillating lever arranged to open one trap on its forward movement and the other on its reverse movement, and actuating devices for said lever, substantially as described.

4. The combination with the type-chute or tube containing a trap composed of two separable jaws or plates opening from the center outward, of a plunger or lifter arranged in line with said chute and beneath said trap and spring-actuated feelers, substantially as described.

5. The combination with the type-chute containing two traps, one above the other, of a lifter beneath the lower trap, and spring-actuated feelers between the latter and the lifter, substantially as described.

6. The combination with the carriage and feed-slide carrying type-feeding devices, of means for reciprocating said slide, and actuating devices, such as cams, connected with and moving said carrier transversely to the motion of the feed slide, said actuating devices coming into action at the end of the stroke of the feed slide, whereby the carrier remains stationary until the slide has completed its stroke and then carries the latter away from the frame in a direction at right angles to its own proper motion, substantially as described.

7. The combination of the transversely movable carriage, the feed-slide supported in ways thereof, a cross-shaft receiving motion from the main shaft, a crank on said cross-shaft for actuating the feed-slide, and cams and connections for reciprocating the carriage, substantially as described.

8. The combination of the transversely movable carriage, the feed-slide supported in ways thereof, the crank shaft, and an articulated adjustable connection rod communicating motion from said crank-shaft to said feed slide, substantially as described.

9. The combination with the four-motion feed slide, of the type-reverser carried thereby and having a movable jaw, a stationary gage or stop for displacing said movable jaw for the purpose of permitting a type to be seized, said gage or stop being adjustable transversely and longitudinally with reference to said slide, substantially as described.

10. The combination of the feed slide, the reversing pinchers mounted on a revoluble spindle and having two projecting pins on the end thereof, the overhanging projection for starting the revolution of the spindle by engaging the end of a type held by said pinchers, a stop for engaging one of said pins and completing the reversal of the pinchers, and a guide arm for arresting the rotation when the half-revolution is completed and guiding the pinchers during the further movement of the feed-slide, substantially as described.

11. The combination of the carriage, the feed-slide, the type feeding fingers carried by said slide, a guide pin carried by said fingers, and a guide-groove in which said pin works, substantially as described.

12. The combination of the tripper-mechanism for turning the type on its longitudinal axis, a channel for conducting the type toward the galley formed on one side by a plate having a rib adapted to fit one of the nicks of the type, and feed devices for pushing the type through such channel, substantially as described.

13. The combination with the frame having a type channel beneath which said frame is cut away, feeding devices for advancing the type through said channel, a spring actuated plate forming one side of said channel, the forward motion of said plate being limited so that thin type if turned sidewise would fall out of said channel, substantially as described.

14. The combination of the type-receiving channel formed on one side by a depressible separator-plate, a frame carrying said plate, a spring-actuated slide in said frame adapted when released to come in contact with an eccentric pin on the main shaft, a rod carried by said slide and having a straight corner or ledge, a releasing catch normally holding said rod, and a pin projecting into said channel and connected with said catch so as to remove the same from engagement with said rod when said channel is filled, substantially as described.

15. The combination of the type-receiving channel having on one side a depressible separator plate, a pin lying in said type-channel, an indicator connected with and actuated by said pin, a slide released by the same pin when the latter is displaced from the type-channel, and means actuated on the release of said slide to depress the separator plate, and cut off the line of type, substantially as described.

In testimony whereof I have signed this specification in the presence of two subscribing witnesses.

ALBAN V. RUCKMICH.

Witnesses:
PHILIP MAURO,
REEVE LEWIS.